(12) United States Patent
Ando et al.

(10) Patent No.: US 12,374,475 B2
(45) Date of Patent: Jul. 29, 2025

(54) GROMMET

(71) Applicants: SUMITOMO WIRING SYSTEMS, LTD., Yokkaichi (JP); NISSAN MOTOR CO., LTD., Yokohama (JP)

(72) Inventors: Yusuke Ando, Yokkaichi (JP); Kouichi Kurokawa, Atsugi (JP)

(73) Assignees: SUMITOMO WIRING SYSTEMS, LTD., Yokkaichi (JP); NISSAN MOTOR CO., LTD., Yokohama (JP)

( * ) Notice: Subject to any disclaimer, the term of this patent is extended or adjusted under 35 U.S.C. 154(b) by 195 days.

(21) Appl. No.: 18/546,975

(22) PCT Filed: Feb. 10, 2022

(86) PCT No.: PCT/JP2022/005441
§ 371 (c)(1),
(2) Date: Aug. 18, 2023

(87) PCT Pub. No.: WO2022/181362
PCT Pub. Date: Sep. 1, 2022

(65) Prior Publication Data
US 2024/0136092 A1 Apr. 25, 2024
US 2024/0233988 A9 Jul. 11, 2024

(30) Foreign Application Priority Data
Feb. 24, 2021 (JP) .................................. 2021-027721

(51) Int. Cl.
*H01B 17/58* (2006.01)
*B60R 16/02* (2006.01)
*F16L 5/02* (2006.01)

(52) U.S. Cl.
CPC ....... *H01B 17/583* (2013.01); *B60R 16/0222* (2013.01); *F16L 5/02* (2013.01)

(58) Field of Classification Search
CPC .. H02G 3/22; H02G 3/24; H02G 3/26; H02G 3/28; H02G 3/30; H02G 3/36; B60R 16/02; B60R 16/00; B60R 16/0207; H01B 17/58; H01B 17/30; H01B 17/303; H01B 17/56
USPC .... 174/152 G, 153 G, 152 R, 650, 135, 142; 16/2.1, 2.2; 248/56, 68.1, 49; 439/271, 439/272
See application file for complete search history.

(56) References Cited

U.S. PATENT DOCUMENTS

| | | | | |
|---|---|---|---|---|
| 4,839,937 A | * | 6/1989 | Oikawa | H02G 3/083 174/152 G |
| 6,815,615 B1 | * | 11/2004 | Haulotte | H02G 15/013 174/152 G |
| 7,026,549 B1 | * | 4/2006 | Smutny | F16L 5/10 174/152 G |

(Continued)

FOREIGN PATENT DOCUMENTS

| | | |
|---|---|---|
| JP | 2010088217 A | 4/2010 |
| WO | 2021181741 A1 | 9/2021 |

*Primary Examiner* — Angel R Estrada

(57) ABSTRACT

A grommet includes an umbrella-shaped member that is separate from a grommet body. The umbrella-shaped member has a covering portion that covers an insertion hole of a sound insulator provided on one surface of a vehicle body panel. The covering portion is inclined to increase in diameter toward the sound insulator. The grommet body has an engagement portion that axially locks to a front end of the covering portion, which is the front end of the umbrella-shaped member.

8 Claims, 4 Drawing Sheets

(56) References Cited

U.S. PATENT DOCUMENTS

| | | | | |
|---|---|---|---|---|
| 8,089,002 | B2* | 1/2012 | Hasegawa | H02G 3/22 |
| | | | | 174/152 G |
| 8,134,076 | B2* | 3/2012 | Nagayasu | B60R 16/0222 |
| | | | | 174/152 G |
| 8,299,364 | B2* | 10/2012 | Suzuki | B60R 16/0222 |
| | | | | 174/152 G |
| 8,546,695 | B2* | 10/2013 | Okuhara | B60R 16/0222 |
| | | | | 174/152 G |
| 8,628,093 | B2* | 1/2014 | Suzuki | H02G 3/22 |
| | | | | 277/635 |
| 8,656,553 | B2* | 2/2014 | Okuhara | H02G 3/22 |
| | | | | 16/2.2 |
| 10,449,914 | B2 | 10/2019 | Katoh et al. | |
| 11,186,240 | B2* | 11/2021 | Ando | B60R 16/0222 |
| 11,780,388 | B2* | 10/2023 | Ando | H02G 3/22 |
| | | | | 174/152 G |
| 12,125,610 | B2* | 10/2024 | Sugino | H01B 17/583 |
| 2010/0314158 | A1 | 12/2010 | Suzuki et al. | |

* cited by examiner (Rear) →D1→ (Front)

GROMMET

BACKGROUND

Field of the Disclosure

The present disclosure relates to a grommet.

Related Art

Japanese Laid-Open Patent Publication No. 2009-201204 discloses a grommet attached to a coupling hole extending through a vehicle body panel that separates the interior of a passenger compartment from the exterior of the passenger compartment. The grommet protects a wire harness that is inserted through the coupling hole.

In the structure described in Japanese Laid-Open Patent Publication No. 2009-201204, a sound insulator is adhered to one surface of the vehicle body panel. The sound insulator includes an insertion hole for insertion of the wire harness, which is formed at a position corresponding to the coupling hole of the vehicle body panel. The grommet, attached to the coupling hole of the vehicle body panel, includes an umbrella-shaped covering portion ("flap" in Japanese Laid-Open Patent Publication No. 2009-201204) that covers the insertion hole of the sound insulator. When coupling the grommet to the coupling hole of the vehicle body panel, the grommet is inserted into the coupling hole from the covering portion.

In a grommet such as that described in Patent Literature 1, when coupling the grommet to the coupling hole, contact of the umbrella-shaped covering portion with the edge of the coupling hole will deform and contract the covering portion toward the rear side in the insertion direction. This may result in the covering portion entering the gap between the grommet body, which is in contact with the edge of the coupling hole, and the coupling hole. Thus, there is still room for improvement in this respect.

It is therefore an objective of the present invention to provide a grommet that restricts entry of the covering portion into the gap between the grommet body and the coupling hole of the vehicle body panel.

SUMMARY

A grommet of the present disclosure is interposed between a coupling hole of a vehicle body panel and a wire harness passed through the coupling hole. The grommet includes a grommet body and an umbrella-shaped member. The grommet body includes a tube that surrounds a periphery of the wire harness in a state contacting the wire harness, and a sealing portion that is in contact with an edge of the coupling hole. The umbrella-shaped member is separate from the grommet body. The umbrella-shaped member includes a covering portion that covers an insertion hole of a sound insulator arranged on one surface of the vehicle body panel. The covering portion is inclined so as to increase in diameter toward the sound insulator. The covering portion includes a large-diameter end that contacts a surface of the sound insulator, and the large-diameter end is a rear end of the umbrella-shaped member. The grommet body includes an engagement portion engaged, in an axial direction of the grommet body, with a front end of the umbrella-shaped member that is an end opposite the rear end of the umbrella-shaped member.

The present disclosure provides a grommet that restricts the entry of the covering portion into the gap between the grommet body and the coupling hole of the vehicle body panel.

DETAILED DESCRIPTION

Figure 1:
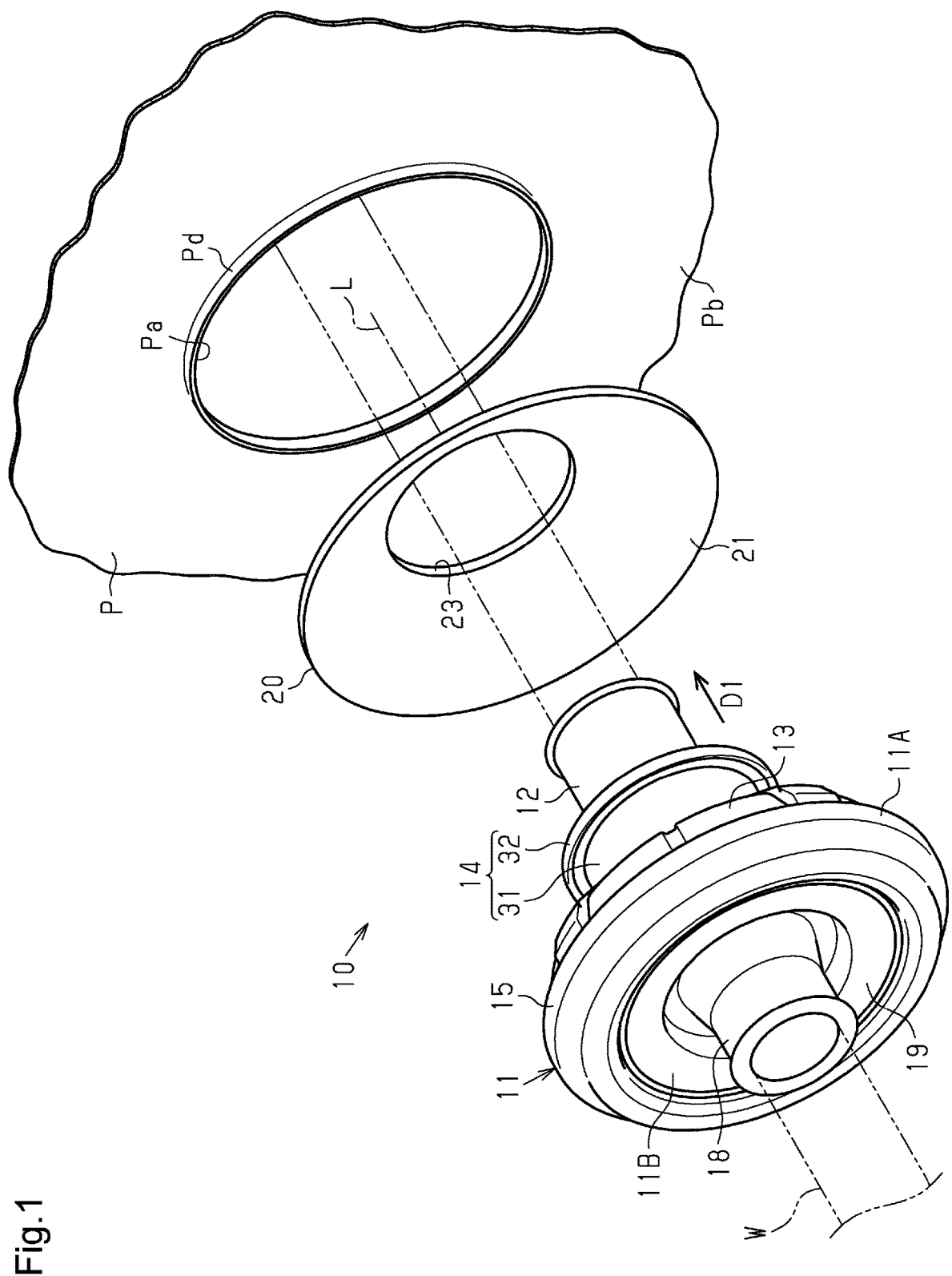
FIG. 1 is an exploded rear perspective view of a grommet according to an embodiment.

Description of Embodiments of the Present Disclosure

Embodiments of the present disclosure will first be listed and described.

[1] A grommet of the present disclosure is interposed between a coupling hole of a vehicle body panel and a wire harness passed through the coupling hole. The grommet includes a grommet body and an umbrella-shaped member. The grommet body includes a tube that surrounds a periphery of the wire harness in a state contacting the wire harness, and a sealing portion that is in contact with an edge of the coupling hole. The umbrella-shaped member is separate from the grommet body. The umbrella-shaped member includes a covering portion that covers an insertion hole of a sound insulator arranged on one surface of the vehicle body panel. The covering portion is inclined so as to increase in diameter toward the sound insulator. The covering portion includes a large-diameter end that contacts a surface of the sound insulator, and the large-diameter end is a rear end of the umbrella-shaped member. The grommet body includes an engagement portion engaged, in an axial direction of the grommet body, with a front end of the umbrella-shaped member that is an end opposite the rear end of the umbrella-shaped member.

With this structure, the grommet body, which is coupled to the coupling hole of the vehicle body panel, is separate from the umbrella-shaped member, which includes the covering portion covering the insertion hole of the sound insulator. Therefore, after the grommet body, which is free from the umbrella-shaped member, is coupled to the coupling hole, the umbrella-shaped member can be coupled to the grommet body, which is coupled to the coupling hole. This restricts entry of the covering portion into the gap between the grommet body and the coupling hole when inserting the grommet body into the coupling hole. In addition, engagement of the engagement portion of the grommet body with the front end of the umbrella-shaped member restricts separation of the umbrella-shaped member from the grommet body.

[2] The engagement portion is located radially outward from the tube, and the engagement portion faces the tube with a gap in between.

With this structure, when the tube follows the wire harness and moves in the radial direction, the gap between the tube and the engagement portion absorbs the movement of the tube. This restricts disengagement of the umbrella-shaped member from the engagement portion when the tube moves in the radial direction.

[3] The grommet body includes an extension located at a radially outer side of the tube and extending in an axial direction of the tube. The extension faces the tube with a gap in between. The engagement portion is arranged on the extension.

With such a structure, when coupling the umbrella-shaped member to the grommet body, the extension, which faces the tube with the gap in between, is bent inward in the radial direction, that is, toward the gap, to allow the engagement portion to be moved inward in the radial direction. This improves the efficiency of coupling the umbrella-shaped member to the grommet body.

[4] The engagement portion includes a projection that projects toward the rear end of the umbrella-shaped member. The projection is located at a radially outer side of the umbrella-shaped member.

With this structure, the projection limits displacement of the umbrella-shaped member in the radial direction. This avoids separation of the umbrella-shaped member from the engagement portion.

[5] The projection is located at a radially outer side of the covering portion of the umbrella-shaped member.

With this structure, the projection of the engagement portion can be suitably positioned at a radially outer side of the umbrella-shaped member.

[6] The front end of the umbrella-shaped member is a small-diameter end of the covering portion.

With such a structure, the front end and the rear end of the covering portion are the front end and the rear end of the umbrella-shaped member. This simplifies the structure of the umbrella-shaped member and allows the umbrella-shaped member to be reduced in size.

Detail of Embodiment of Present Disclosure

A specific example of a grommet of the present disclosure will now be described with reference to the drawings. In the drawings, elements are illustrated for simplicity and have not necessarily been drawn to scale. The present disclosure is not limited to these examples. The scope of the present disclosure and equivalence of the present disclosure are to be understood with reference to the appended claims.

Figure 2:
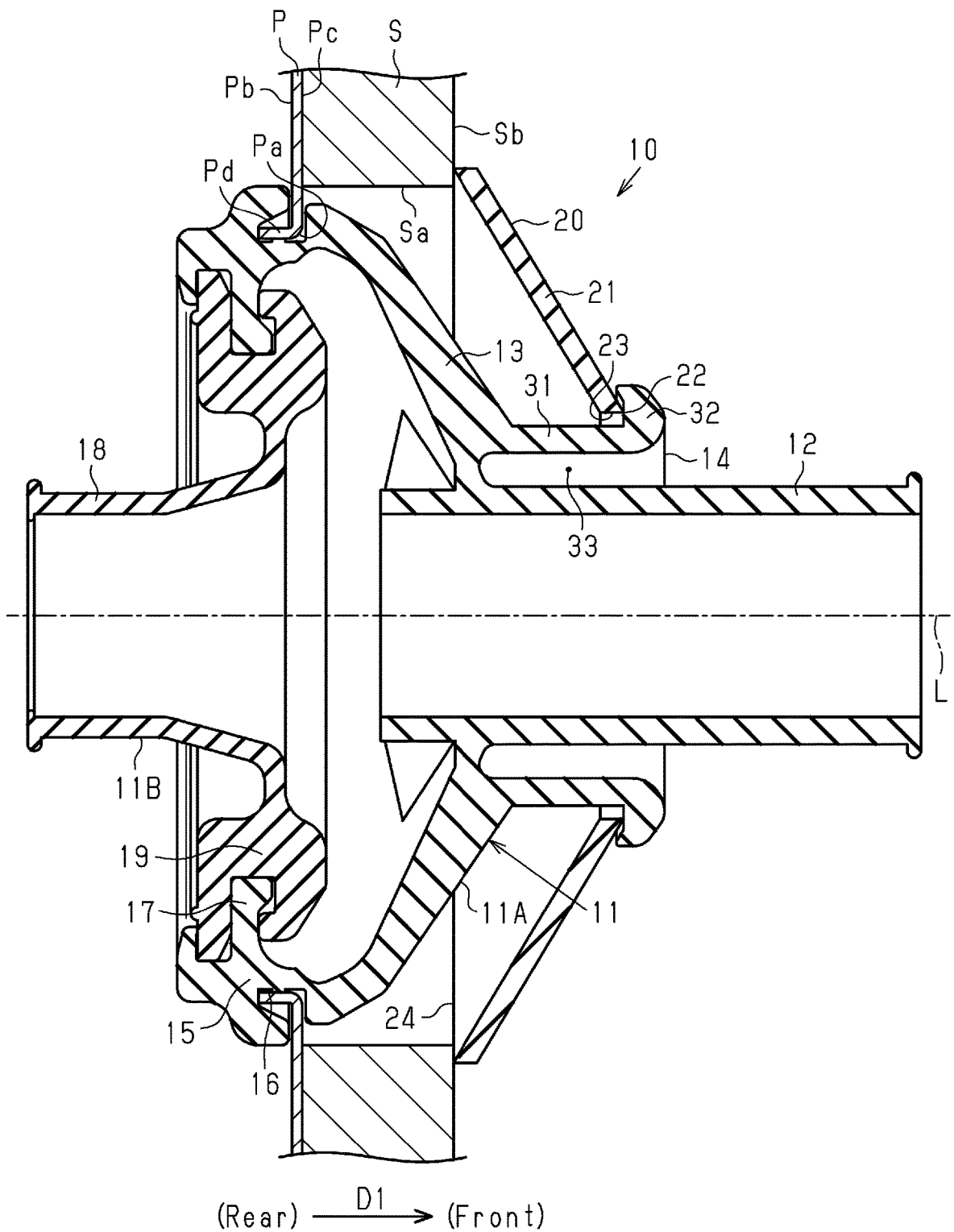
FIG. 2 is a cross-sectional view of the grommet according to the embodiment.

A grommet 10 shown in FIGS. 1 and 2 is attached to a coupling hole Pa, extending through a vehicle body panel P that separates the interior of a passenger compartment from the exterior of the passenger compartment, to protect a wire harness W inserted into the coupling hole Pa. In addition, the grommet 10 also serves to restrict the entry of water into the coupling hole Pa of the vehicle body panel P. The wire harness W includes at least one electric wire. An axial direction of the grommet 10 corresponds to the insertion direction in which the wire harness W is inserted through the grommet 10.

The grommet 10 includes a grommet body 11 and an umbrella-shaped member 20 that is separate from the grommet body 11. The grommet body 11 is inserted into the coupling hole Pa of the vehicle body panel P in the insertion direction D1 that is parallel to axis L. In the following description, the front side and the rear side of the grommet body 11 with respect to the insertion direction D1 may simply be referred to as the front side and the rear side, respectively, or the front side in the axial direction and the rear side in the axial direction, respectively. In addition, in the following description, the direction parallel to the axis L, a circumferential direction about the axis L, and a radial direction about the axis L may simply be referred to as the axial direction, the circumferential direction, and the radial direction, respectively. In a state where the grommet 10 is attached to the coupling hole Pa, the front side in the insertion direction D1 is the passenger compartment interior side of the vehicle body panel P, and the rear side in the insertion direction D1 is the passenger compartment exterior side of the vehicle body panel P.

The edge of the coupling hole Pa in the vehicle body panel P undergoes a burring process and is bent in the thickness direction of the vehicle body panel P. In the present embodiment, a protrusion Pd protrudes around the coupling hole Pa from surface Pb of the vehicle body panel P that is exposed to the passenger compartment exterior side. More specifically, the protrusion Pd protrudes rearward in the insertion direction D1 from around the coupling hole Pa. The protrusion Pd is bent at a substantially right angle with respect to surface Pb of the vehicle body panel P.

As shown in FIG. 2, a sound insulator S is attached to surface Pc of the vehicle body panel P. The sound insulator S may be a non-woven fabric, a rubber plate, a foamed layer, or the like. The sound insulator S includes an insertion hole Sa for insertion of a wire harness at a position corresponding to the coupling hole Pa. A covering portion 21 closes the insertion hole Sa of the sound insulator S.

Grommet Body 11

The grommet body 11 includes, for example, a first grommet 11A and a second grommet 11B coupled to the first grommet 11A. The first grommet 11A and the second grommet 11B are separate from each other. The first grommet 11A and the second grommet 11B are formed of an elastic material such as rubber. The elastic material of the first grommet 11A and the second grommet 11B may be ethylene propylene diene rubber (EPDM). The first grommet 11A and the second grommet 11B may be formed from the same elastic material or from different elastic materials. When using different materials, it is preferred that the two elastic materials have flexibility such as rubber or the like.

First Grommet 11A

Figure 3:
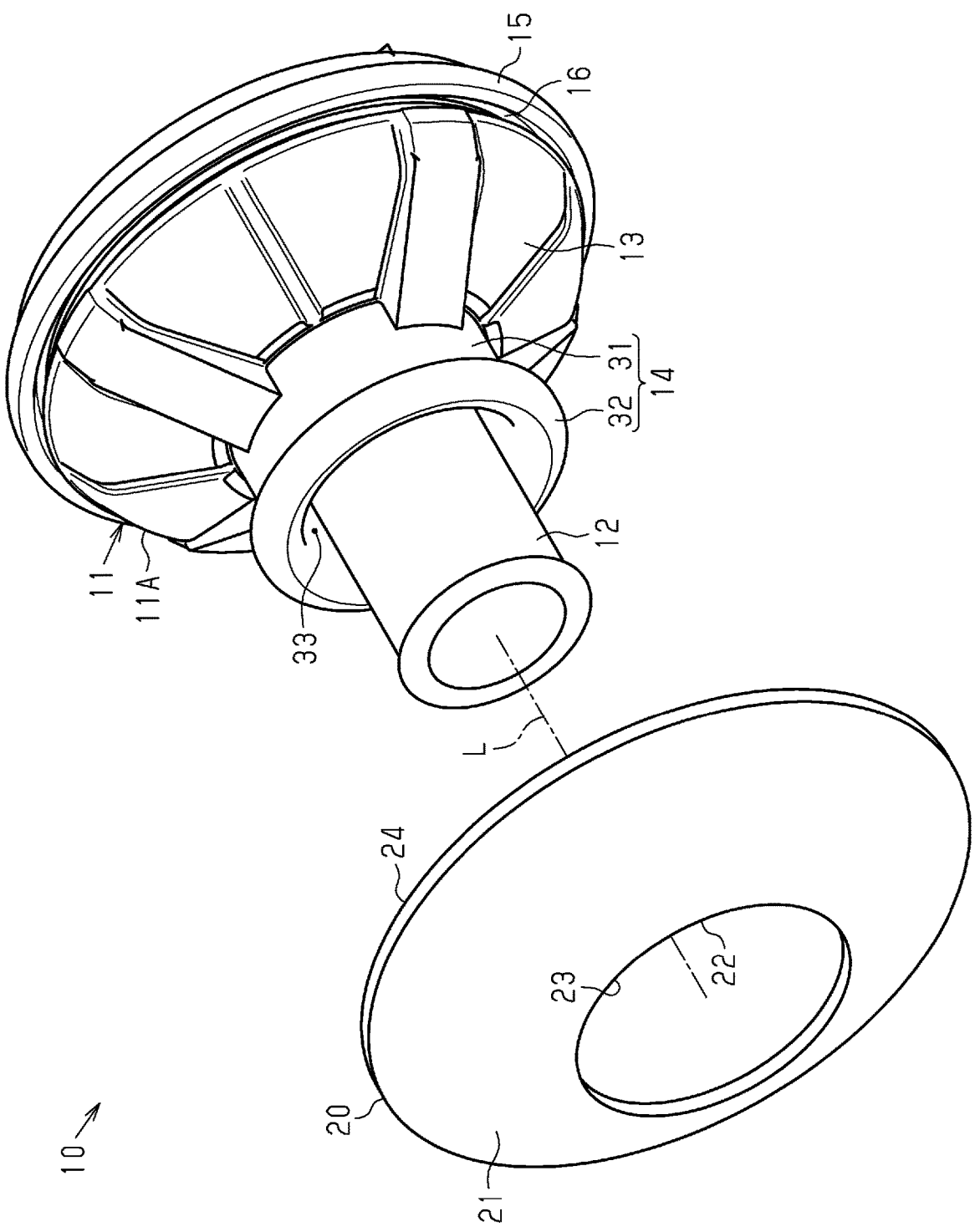
FIG. 3 is an exploded front perspective view of the grommet according to the embodiment.

As shown in FIGS. 2 and 3, the first grommet 11A includes a first tube 12 that is tubular and surrounds the periphery of the wire harness W, a diameter-increasing portion 13 having a diameter that increases toward the rear side from the first tube 12, and a holder 14 holding the umbrella-shaped member 20.

The first tube 12 has a cross section orthogonal to the axis L of the grommet 10 that is ring-shaped and centered on the axis L. The wire harness W is inserted into the first tube 12 in a liquid-tight manner.

The term "ring" as used in this specification refers to any closed outer edge shape formed by connecting straight lines or curved lines and includes a ring having a circular outer edge shape, a ring having an elliptical or oval outer edge shape, a polygonal ring having a polygonal outer shape, and a ring having a polygonal outer edge shape with rounded corners. A "ring" is a shape having a hole in a plane view, where the outer edge shape and the shape of the through hole may be the same or different. A "ring" has a predetermined length in the direction in which the through hole extends, and the length may be of any dimension.

The diameter-increasing portion 13 projects from the outer circumferential surface of the first tube 12 and has an increasing diameter. The diameter-increasing portion 13 is substantially a circle, the center of which is the axis L, as viewed in the axial direction. In addition, the diameter-increasing portion 13 has a tapered shape and is increased in diameter toward the rear end in the axial direction. The circumferential edge of the diameter-increasing portion 13 is ring-shaped and is in conformance with the edge of the coupling hole Pa.

A sealing portion 15 is formed on the circumferential edge of the diameter-increasing portion 13. The sealing portion 15 is substantially cylindrical and centered on the axis L. The outer circumferential surface of the sealing portion 15 includes an outer circumference groove 16 that receives the edge of the coupling hole Pa. The outer circumference groove 16, formed over the entire circumference of the sealing portion 15, is ring-shaped and centered on the axis L. The outer circumference groove 16 contacts the edge of the coupling hole Pa and seals the gap between the sealing portion 15 and the coupling hole Pa in a liquid-tight manner.

The first grommet 11A includes a connection piece 17 extending radially inward from the inner circumferential surface of the sealing portion 15. The connection piece 17, formed over the entire circumference of the sealing portion 15, is ring-shaped and centered on the axis L.

Second Grommet 11B

As shown in FIG. 2, the second grommet 11B is coupled to the first grommet 11A to close a rear axial end opening of the first grommet 11A. The second grommet 11B includes a second tube 18 surrounding the periphery of the wire harness W and a fixing portion 19 extending outward from the second tube 18.

The second tube 18 has a cross section orthogonal to the axis L of the grommet 10 that is ring-shaped and centered on the axis L. The wire harness W is inserted into the second tube 18 in a liquid-tight manner. The second tube 18, for example, has substantially the same diameter as the first tube 12 of the first grommet 11A.

The fixing portion 19 is formed at, for example, the front end of the second tube 18. The fixing portion 19 clamps the connection piece 17 of the first grommet 11A in the axial direction. This connects the fixing portion 19 and the connection piece 17 to fix the second grommet 11B to the first grommet 11A. In a state where the first grommet 11A and the second grommet 11B are coupled, a space is formed inside the grommet body 11. This space improves the sound insulation of the grommet 10.

Umbrella-Shaped Member 20

The umbrella-shaped member 20, which is separate from the grommet body 11, is arranged on the front side of the diameter-increasing portion 13 of the first grommet 11A. The umbrella-shaped member 20 is formed of an elastic material such as rubber. The elastic material used for the umbrella-shaped member 20 is, for example, ethylene propylene diene rubber (EPDM). The umbrella-shaped member 20 and the grommet body 11 may be formed from the same elastic material or from different elastic material. When using different materials, it is preferred that two elastic materials have flexibility such as rubber or the like.

As shown in FIGS. 2 and 3, the umbrella-shaped member 20 includes the covering portion 21 that covers the insertion hole Sa of the sound insulator S. The covering portion 21 is tapered and has a diameter that increases from the front end 22 toward the rear end side in the axial direction. The umbrella-shaped member 20 of the present embodiment includes only the tapered covering portion 21. The covering portion 21 is, for example, ring-shaped as viewed in the axial direction. The covering portion 21 is located outward from the first tube 12. The inner circumference edge 23 of the covering portion 21 is, for example, circular and centered on the axis L when viewed in the axial direction. In addition, the outer circumference of the covering portion 21 is, for example, circular and centered on the axis L as viewed in the axial direction. A rear end 24 in the axial direction of the covering portion 21 is configured to elastically abut the sound insulator S.

Holder 14

The holder 14 of the grommet body 11 is formed at the radially outer side of the first tube 12. The holder 14 is, for example, ring-shaped and centered on the axis L.

The holder 14 includes an extension 31 extending frontward in the axial direction from the diameter-increasing portion 13, and an engagement portion 32 projecting radially outward from the extension 31.

The extension 31 is, for example, cylindrical and centered on the axis L. The extension 31 has a larger outer diameter than the first tube 12. The inner circumferential surface of the extension 31 faces the outer circumferential surface of the first tube 12 with a gap 33 in between. The front end of the extension 31 is located, for example, toward the rear end of the first tube 12 from the front end of the first tube 12.

The engagement portion 32, for example, projects radially outward from a front end of the extension 31. The engagement portion 32 is, for example, ring-shaped and centered on the axis L. More specifically, the engagement portion 32 extends over the entire circumference of the extension 31. In addition, the engagement portion 32 faces the outer circumferential surface of the first tube 12 with the gap 33 in between.

Figure 4:
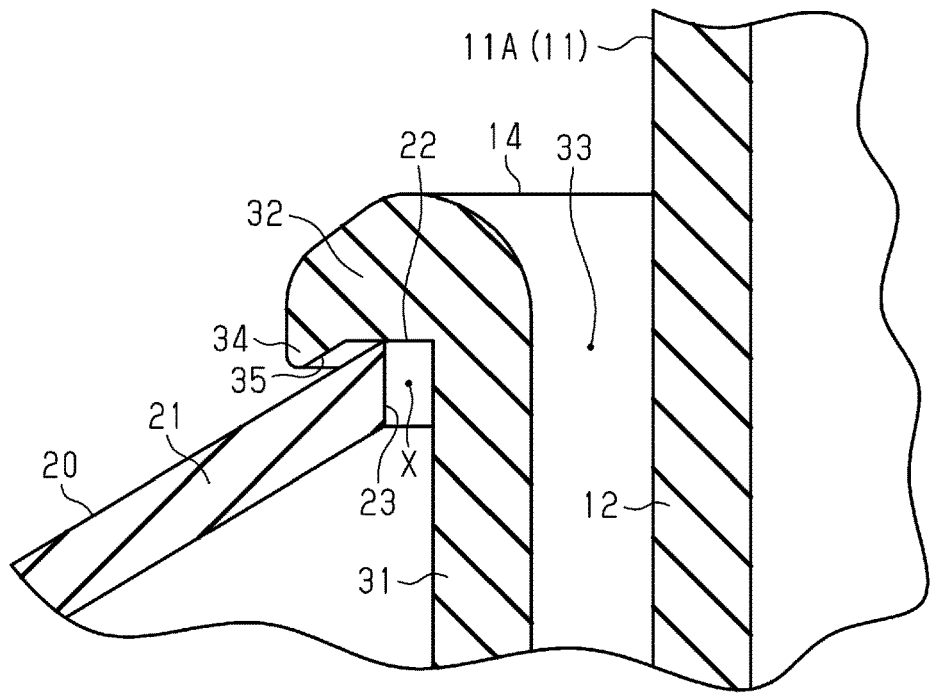
FIG. 4 is an enlarged cross-sectional view showing a main part of the grommet according to the embodiment.

As shown in FIG. 4, the engagement portion 32 includes a projection 34 projecting rearward in the axial direction. The projection 34 is formed, for example, at a radially outer end of the engagement portion 32. The surface at the radially inner side of the projection 34 is, for example, an inclined surface 35 of which the diameter increases rearward in the axial direction. This narrows the distal end at the rear side of the projection 34.

The state of the grommet 10 coupled to the coupling hole Pa will now be described.

As shown in FIG. 1, first, the wire harness W is inserted through the grommet body 11 and the umbrella-shaped member 20. At this time, the wire harness W is inserted through the first tube 12 and the second tube 18 of the grommet body 11, and is inserted through the inner circumference edge 23 of the covering portion 21 of the umbrella-shaped member 20. In this state, the umbrella-shaped member 20 is not coupled to the grommet body 11, and the grommet body 11 and the umbrella-shaped member 20 are located at the side of surface Pb of the vehicle body panel P.

Figure 5:
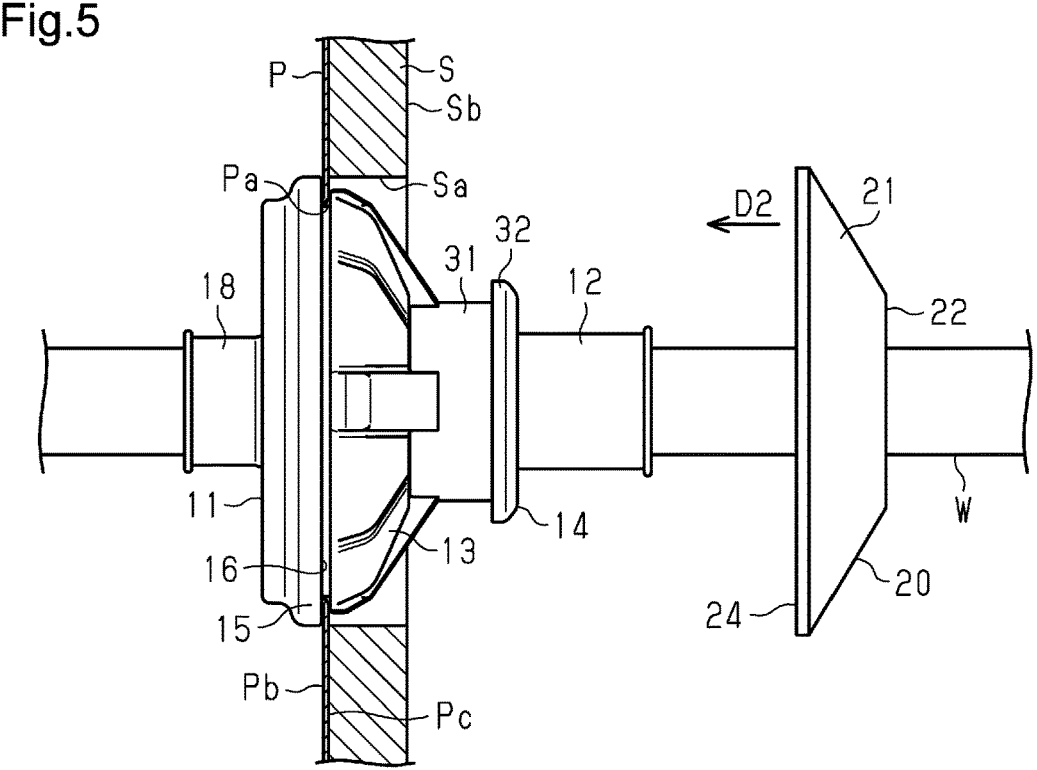
FIG. 5 is a side view illustrating the coupled state of the grommet according to the embodiment.

Next, the umbrella-shaped member 20 at the side of surface Pb of the vehicle body panel P is deformed and passed through the coupling hole Pa of the vehicle body panel P. As shown in FIG. 5, this disposes the umbrella-shaped member 20 at the side of surface Pc of the vehicle body panel P.

Next, the grommet body 11 is inserted into the coupling hole Pa of the vehicle body panel P in the insertion direction D1 to couple the grommet body 11 to the coupling hole Pa. The diameter-increasing portion 13 of the grommet body 11 is inserted into the coupling hole Pa and deformed radially inward when contacting the edge of the coupling hole Pa. Then, the edge of the coupling hole Pa enters the outer circumference groove 16 of the sealing portion 15 in the grommet body 11. In a state where the grommet body 11 is coupled to the coupling hole Pa, part of the grommet body 11 is located inside the insertion hole Sa of the sound insulator S. In this state, at least the front end of the holder 14 projects frontward in the insertion direction D1 from surface Sb of the sound insulator S.

Next, the umbrella-shaped member 20 is coupled to the grommet body 11, which is coupled to the coupling hole Pa, in a coupling direction D2, which is opposite to the insertion direction D1. In this case, the rear end 24 of the covering portion 21 of the umbrella-shaped member 20 first contacts the surface Sb of the sound insulator S. The axial dimension of the umbrella-shaped member 20 before being coupled, that is, the axial dimension of the covering portion 21 in the present embodiment, is set to be larger than the axial dimension from surface Sb of the sound insulator S to the engagement portion 32 of the holder 14. Thus, when coupling the umbrella-shaped member 20, in a state where the rear end 24 of the covering portion 21 is in contact with the surface Sb of the sound insulator S, force is applied in the coupling direction D2 to the front end 22 of the covering portion 21, that is, the end at the inner circumference edge 23, to hook the front end 22 of the covering portion 21 onto the engagement portion 32. Thus, the covering portion 21 is held between surface Sb of the sound insulator S and the engagement portion 32 in a state where the covering portion 21 is slightly contracted in the axial direction. When the front end 22 of the covering portion 21 is hooked onto the engagement portion 32, the extension 31 is bent radially inward, that is, toward the gap 33, thereby moving the engagement portion 32 radially inward.

As shown in FIG. 4, in a state where the umbrella-shaped member 20, that is, the covering portion 21, is coupled to the grommet body 11, the front end 22 of the covering portion 21 abuts the engagement portion 32 in the axial direction. The diameter of the inner circumference edge 23 of the covering portion 21 is set to be larger than the outer diameter of the extension 31 of the holder 14. Thus, the inner circumference edge 23 of the covering portion 21 faces the extension 31 in the radial direction with a gap X in between. Depending on the coupling state of the umbrella-shaped member 20, part of the inner circumference edge 23 in the circumferential direction may contact the extension 31. Further, in a state in which the umbrella-shaped member 20 is coupled to the grommet body 11, the projection 34 of the engagement portion 32 is located radially outward from the front end 22 of the covering portion 21. More specifically, the projection 34 faces the outer surface of the covering portion 21 in the radial direction.

The operation of this embodiment will be described.

The grommet 10 includes the grommet body 11 including the sealing portion 15 contacting the edge of the coupling hole Pa, and the umbrella-shaped member 20 including the covering portion 21 covering the insertion hole Sa of the sound insulator S. The umbrella-shaped member 20 is separate from the grommet body 11. Therefore, after the grommet body 11, which is free from the umbrella-shaped member 20, is coupled to the coupling hole Pa, the umbrella-shaped member 20 can be coupled to the grommet body 11, which is coupled to the coupling hole Pa. This restricts entry of the covering portion 21 into the gap between the grommet body 11 and the coupling hole Pa when inserting the grommet body 11 into the coupling hole Pa.

The advantages of the embodiment will now be described.

(1) The covering portion 21 of the umbrella-shaped member 20 is inclined so as to increase in diameter toward the sound insulator S. Further, the rear end 24, which is the large-diameter end of the covering portion 21 abuts surface Sb of the sound insulator S. The grommet body 11 includes the engagement portion 32 engaged with the front end 22 of the covering portion 21 in the axial direction. With such a structure, engagement of the engagement portion 32 of the grommet body 11 with the front end 22 of the covering portion 21 restricts separation of the umbrella-shaped member 20 from the grommet body 11.

(2) The engagement portion 32 is located radially outward from the first tube 12. The engagement portion 32 faces the first tube 12 with the gap 33 therebetween. With this structure, when the first tube 12 follows the wire harness W and moves in the radial direction, the gap 33 between the first tube 12 and the engagement portion 32 absorbs the movement of the first tube 12. This restricts disengagement of the umbrella-shaped member 20 from the engagement portion 32 when the first tube 12 moves in the radial direction.

(3) The grommet body 11 includes the extension 31 that is located radially outward from the first tube 12 and extends in the axial direction of the first tube 12. The extension 31 faces the first tube 12 with the gap 33 in between. The engagement portion 32 is arranged on the extension 31. With such a structure, when coupling the umbrella-shaped member 20 to the grommet body 11, the extension 31, which faces the first tube 12 with the gap 33 in between, is bent inward in the radial direction, that is, toward the gap 33, to allow the engagement portion 32 to be moved inward in the radial direction. This improves the efficiency of coupling the umbrella-shaped member 20 to the grommet body 11.

(4) The engagement portion 32 includes the projection 34 that projects toward the rear end 24 of the covering portion 21. The projection 34 is located radially outward from the umbrella-shaped member 20, more specifically, the covering portion 21. With this structure, the projection 34 limits displacement of the umbrella-shaped member 20 in the radial direction. This avoids separation of the umbrella-shaped member 20 from the engagement portion 32.

(5) The front end of the umbrella-shaped member 20 is the small-diameter end of the covering portion 21, that is, the front end 22. With such a structure, the front end 22 and the rear end 24 of the covering portion 21 are the front end and the rear end of the umbrella-shaped member 20. This simplifies the structure of the umbrella-shaped member 20 and allows the umbrella-shaped member 20 to be reduced in size.

(6) The inner circumference edge 23 of the covering portion 21 faces the extension 31 in the radial direction with the gap X in between. With such structure, regardless of the manufacturing tolerances of the grommet body 11 and umbrella-shaped member 20, the structure includes the gap X extending in the radial direction between the inner circumference edge 23 of the covering portion 21 and the extension 31. Thus, the diameter of the inner circumference edge 23 of the covering portion 21 will not be smaller than the outer diameter of the extension 31, and the extension 31 will not be tightened by the inner circumference edge 23 of the covering portion 21. Accordingly, the umbrella-shaped member 20 will not be coupled in a state in which the extension 31 is deformed radially inward. As a result, the umbrella-shaped member 20 can be stably held by the engagement portion 32.

The present embodiment can be modified and practiced as described below. The present embodiment and the following modified examples can be implemented in combination with each other as long as there is no technical contradiction.

The shape of the covering portion 21 as viewed in the axial direction does not have to be circular shape and can be changed to be, for example, elliptical or polygonal in conformance with the shape of the insertion hole Sa of the sound insulator S.

The umbrella-shaped member 20 of the embodiment described above includes only the tapered covering portion 21. This is not a limitation. For example, the umbrella-shaped member 20 may include a tube that is tubular and extends forward in the axial direction from the inner circumference edge 23 of the covering portion 21. In this case, the front end of the umbrella-shaped member 20 is the front end of the tubular portion, and the engagement portion 32 is engaged with the front end of the tubular portion in the axial direction.

In the embodiment described above, the extension 31 and the engagement portion 32 each extend continuously in the circumferential direction. This is not a limitation. The extension 31 and the engagement portion 32 may each extend in a non-continuous manner in the circumferential direction.

The projection 34 may be omitted from the engagement portion 32 of the embodiment described above.

The extension 31 may be omitted from the grommet body 11 of the embodiment described above, and the engagement portion 32 may be arranged on the outer circumferential surface of the first tube 12.

The shape of the sealing portion 15 when viewed in the axial direction does not have to be circular and can be changed to, for example, be elliptical in accordance with the shape of the coupling hole Pa.

In the embodiment described above, the grommet body 11 includes the two components of the first grommet 11A and the second grommet 11B. This is not a limitation. The grommet body 11 may include one component.

The elastic material used for the grommet body 11 and the umbrella-shaped member 20 is not limited to EPDM, and other materials such as NBR (acrylonitrile butadiene rubber) can be used.

In the present embodiment, the protrusion Pd at the edge of the coupling hole Pa protrudes outward from the passenger compartment. This is not a limitation. The protrusion Pd may protrude inward into the passenger compartment. Further, the grommet body 11 may be configured to be inserted into the coupling hole Pa from inside the passenger compartment.

The protrusion Pd on the edge of the coupling hole Pa may be inclined relative to the axis L. A structure in which the protrusion Pd is omitted from the coupling hole Pa (that is, a structure in which the burring process is not applied to the coupling hole Pa) may be employed.

As shown in the illustrated embodiment, the grommet body 11 may include the extension 31 that is continuous with the engagement portion 32 and has an extension length in the axial direction, and the extension length of the extension 31 of the grommet body 11 may allow the front end 22 of the umbrella-shaped member 20 to move in the axial direction along the extension 31. This structure is advantageous in that, for example, the grommet 10 can be applied to sound insulators S of various thicknesses exerting various sound insulating properties.

As shown in FIG. 4, the extension 31 may have a tubular outer circumferential surface having a first outer diameter. The engagement portion 32 may project radially outward from the extension 31 so as to have a second outer diameter that is larger than the outer diameter of the extension 31. The front end 22 of the umbrella-shaped member 20 may include the inner circumference edge 23 that has an inner diameter larger than the outer diameter of the extension 31 and smaller than the outer diameter of the engagement portion 32.

REFERENCE SIGNS LIST 10) grommet
11) grommet body
11A) first grommet
11B) second grommet
12) first tube (tubular portion)
13) diameter-increasing portion
14) holder
15) sealing portion
16) outer circumference groove
17) connection piece
18) second tube
19) fixing portion
20) umbrella-shaped member
21) covering portion
22) front end
23) inner circumference edge
24) rear end
31) extension
32) engagement portion
33) gap
34) projection
35) inclined surface
D1) insertion direction of the grommet body
D2) coupling direction of the umbrella-shaped member
L) axis
P) vehicle body panel
Pa) coupling hole
Pb) surface
Pc) surface
Pd) protrusion
S) sound insulator
Sa) insertion hole
Sb) surface
W) wire harness
X) gap

The invention claimed is:

1. A grommet interposed between a coupling hole of a vehicle body panel and a wire harness passed through the coupling hole, the grommet comprising:
a grommet body including a tube that surrounds a periphery of the wire harness in a state contacting the wire harness, and a sealing portion that is in contact with an edge of the coupling hole; and
an umbrella-shaped member that is separate from the grommet body, wherein
the umbrella-shaped member includes a covering portion that covers an insertion hole of a sound insulator arranged on one surface of the vehicle body panel,
the covering portion is inclined so as to increase in diameter toward the sound insulator,
the covering portion includes a large-diameter end that contacts a surface of the sound insulator, and the large-diameter end is a rear end of the umbrella-shaped member, and
the grommet body includes an engagement portion engaged, in an axial direction of the grommet body, with a front end of the umbrella-shaped member that is an end opposite the rear end of the umbrella-shaped member.

2. The grommet according to claim 1, wherein:
the engagement portion is located radially outward from the tube; and
the engagement portion faces the tube with a gap in between.

3. The grommet according to claim 2, wherein:
the grommet body includes an extension located at a radially outer side of the tube and extending in an axial direction of the tube;
the extension faces the tube with a gap in between; and
the engagement portion is arranged on the extension.

4. The grommet according to claim 1, wherein:
the engagement portion includes a projection that projects toward the rear end of the umbrella-shaped member; and
the projection is located at a radially outer side of the umbrella-shaped member.

5. The grommet according to claim 4, wherein the projection is located at a radially outer side of the covering portion of the umbrella-shaped member.

6. The grommet according to claim 1, wherein the front end of the umbrella-shaped member is a small-diameter end of the covering portion.

7. The grommet according to claim 1, wherein:
the grommet body includes an extension that is continuous with the engagement portion and has an extension length in the axial direction; and
the extension length of the extension of the grommet body allows the front end of the umbrella-shaped member to move in the axial direction along the extension.

8. The grommet according to claim 7, wherein:
the extension includes a tubular outer circumferential surface having a first outer diameter;
the engagement portion projects radially outward from the extension so as to have a second outer diameter that is larger than the first outer diameter; and
the front end of the umbrella-shaped member includes an inner circumference edge having an inner diameter that is larger than the first outer diameter and smaller than the second outer diameter.

* * * * *